(12) United States Patent
Dubief et al.

(10) Patent No.: US 11,633,061 B2
(45) Date of Patent: Apr. 25, 2023

(54) BEVERAGE PREPARATION APPARATUS COMPRISING A MIXING CHAMBER

(71) Applicant: SOCIETE DES PRODUITS NESTLE S.A., Vevey (CH)

(72) Inventors: Flavien Dubief, Champagne (CH); Kevin Jamolli, Le Mont-sur-Lausanne (CH); Lucio Scorrano, Yverdon-les-Bains (CH)

(73) Assignee: Societe des Produits Nestle S.A., Vevey (CH)

( * ) Notice: Subject to any disclaimer, the term of this patent is extended or adjusted under 35 U.S.C. 154(b) by 392 days.

(21) Appl. No.: 16/955,509

(22) PCT Filed: Dec. 17, 2018

(86) PCT No.: PCT/EP2018/085285
§ 371 (c)(1),
(2) Date: Jun. 18, 2020

(87) PCT Pub. No.: WO2019/121554
PCT Pub. Date: Jun. 27, 2019

(65) Prior Publication Data
US 2020/0315392 A1 Oct. 8, 2020

(30) Foreign Application Priority Data
Dec. 21, 2017 (EP) ..................... 17209230

(51) Int. Cl.
*A47J 31/40* (2006.01)
*A47J 31/46* (2006.01)

(52) U.S. Cl.
CPC .......... *A47J 31/401* (2013.01); *A47J 31/46* (2013.01); *A47J 31/462* (2013.01)

(58) Field of Classification Search
CPC ......... A47J 31/401; A47J 31/46; A47J 31/462
See application file for complete search history.

(56) References Cited

U.S. PATENT DOCUMENTS

| 8,960,079 B2 * | 2/2015 | Gugerli | ............... A47J 31/401 99/275 |
| 9,307,859 B2 * | 4/2016 | Gugerli | .................. A23L 2/54 |

(Continued)

FOREIGN PATENT DOCUMENTS

| CN | 101703360 A | 5/2010 |
| CN | 201814397 U | 5/2011 |

(Continued)

OTHER PUBLICATIONS

Chinese Office Action for Appl No. 201880080777 dated Nov. 16, 2021.

*Primary Examiner* — Michael Collins
(74) *Attorney, Agent, or Firm* — K&L Gates LLP (57) ABSTRACT

The invention concerns a beverage preparation apparatus (100), said apparatus comprising at least one chamber (1) for receiving and mixing an aqueous liquid and at least one soluble beverage ingredient, said chamber comprising: —a lateral side wall (11) comprising a liquid inlet (2), —a bottom wall (12) comprising a beverage outlet (3), and wherein the liquid inlet is positioned close to the bottom of the chamber, and wherein the liquid inlet is configured so that the liquid is introduced in the chamber as a straight jet of liquid, said introduced straight jet extending transversely through the internal volume of the chamber along a line L, said line L being offset relative to the longitudinal central axis (XX') of the chamber, wherein, at the area of the cylindrical lateral side wall opposed to the liquid inlet and crossed by the line L, the chamber comprises a bump (4) extending from the cylindrical lateral side wall inside the chamber, said bump presenting a shape designed: —to convert the introduced straight jet of liquid extending transversely through the internal volume of the chamber into a swirl flowing along the lateral side wall off the chamber, and (Continued)

—to reduce the diameter of the swirl rotating back to the bump and to guide said swirl in direction of the liquid inlet.

20 Claims, 8 Drawing Sheets

(56) References Cited

U.S. PATENT DOCUMENTS

| | | | |
|---|---|---|---|
| 9,723,943 B2 * | 8/2017 | Beausire | A47J 31/404 |
| 2010/0067322 A1 * | 3/2010 | Maver | A47J 31/401 |
| | | | 366/132 |
| 2010/0173057 A1 * | 7/2010 | Gugerli | A47J 31/46 |
| | | | 99/323.1 |
| 2010/0192783 A1 * | 8/2010 | Sirbu Villa | A47J 31/401 |
| | | | 99/323.3 |
| 2018/0000280 A1 * | 1/2018 | Dubief | A47J 31/401 |
| 2019/0274468 A1 * | 9/2019 | Dubief | A47J 31/401 |

FOREIGN PATENT DOCUMENTS

| | | |
|---|---|---|
| CN | 103417137 A | 12/2013 |
| CN | 204207591 U | 3/2015 |
| CN | 105246822 A | 1/2016 |
| WO | 2008071613 | 6/2008 |
| WO | 2014206868 | 12/2014 |
| WO | 2018091358 | 5/2018 |

\* cited by examiner

BEVERAGE PREPARATION APPARATUS COMPRISING A MIXING CHAMBER

CROSS REFERENCE TO RELATED APPLICATIONS

The present application is a National Stage of International Application No. PCT/EP2018/085285, filed on Dec. 17, 2018, which claims priority to European Patent Application No. 17209230.6, filed on Dec. 21, 2017, the entire contents of which are being incorporated herein by reference.

FIELD OF THE INVENTION

The present invention relates to beverage dispensers preparing beverages from a soluble beverage ingredient and in which a dose of said ingredient is mixed with a liquid in a mixing chamber.

BACKGROUND OF THE INVENTION

WO 2008/071613 describes a beverage preparation machine comprising a mixing chamber for preparing frothed beverages wherein a dose of a beverage soluble ingredient is mixed with a liquid. This mixing chamber presents the great advantage of being devoid of any agitating device driven by a motor. The agitation, dissolution and frothing is obtained by the force of water jet introduced inside the chamber. As a result the manufacturing cost of the machine is low.

Such a mixing chamber is particularly adapted for preparing a frothed coffee beverage from soluble instant coffee. The mixing chamber provides sufficient agitation with the water to dissolve and froth the coffee.

If it is desired to produce a beverage with milk where milk is prepared from soluble milk powder with such a chamber, various problems are encountered.

First, a milk beverage such as a coffee latte or a cappuccino requires a certain volume of milk, generally between 150 and 250 ml of milk. It is much more than the volume for preparing a coffee espresso that is about 60 ml. It means that the chamber must be designed to dissolve and froth a larger volume of liquid and to be able to dispense the beverage rapidly, precisely by means of a large beverage outlet. Yet, a large beverage outlet does not enable the milk beverage to stay in the chamber for a time sufficient to correctly froth the milk. The large quantity of liquid introduced in the chamber rapidly reaches the beverage outlet, even if it is swirled, and flows through the large outlet.

An easy solution to solve these problems is to use a clamping device to close or open the beverage outlet. With such a clamping device, it is possible to increase the time the beverage is agitated inside the chamber and simultaneously to provide a large outlet to rapidly dispense the beverage once ready. Yet such a clamping device must be actuated by a motor with a direct impact on the cost of the machine.

There is a need for providing a beverage apparatus for preparing an important volume of beverage from a soluble beverage ingredient with a mixing chamber devoid of motor.

It would be advantageous to provide a beverage apparatus for preparing an important volume of beverage from a soluble beverage ingredient with a mixing chamber devoid of motor and enabling a rapid dispensing of said beverage.

It would be advantageous to provide a mixing chamber with an off-centred beverage outlet in order to dispense the beverage in a cup supplied simultaneously with another beverage prepared in another mixing chamber.

It would be advantageous to manufacture at low costs a beverage preparation machine enabling the preparation of at least two beverage components, in particular frothed milk and coffee.

It would be advantageous to provide such a beverage preparation machine enabling the preparation of a least two beverage components from different soluble beverage ingredients stored in the machine and presenting small footprint and height size.

SUMMARY OF THE INVENTION

According to a first aspect, there is provided a beverage preparation apparatus, said apparatus comprising at least one chamber for receiving and mixing an aqueous liquid and at least one soluble beverage ingredient, said chamber comprising:
   a lateral side wall, the lower part of said wall being essentially cylindrical and said lateral side wall comprising a liquid inlet,
   a bottom wall comprising a beverage outlet, and
   wherein the liquid inlet is positioned close to the bottom of the chamber, and
   wherein the liquid inlet is configured so that the liquid is introduced in the chamber as a straight jet of liquid, said introduced straight jet extending transversely through the internal volume of the chamber along a line L, said line L being offset relative to the longitudinal central axis of the chamber,
   wherein, at the area of the cylindrical lateral side wall opposed to the liquid inlet and crossed by the line L, the chamber comprises a bump extending from the cylindrical lateral side wall inside the chamber, said bump presenting a shape designed:
      to convert the introduced straight jet of liquid extending transversely through the internal volume of the chamber into a swirl flowing along the lateral side wall off the chamber, and
      to reduce the diameter of the swirl rotating back to the bump and to straight up said swirl in direction of the liquid inlet.

The chamber of the apparatus comprises a lateral side wall. Preferably, the chamber is positioned in the apparatus so that the lateral side wall is substantially vertical. The lower part of the lateral side wall is essentially cylindrical part.

The rest of the lateral side wall can be cylindrical too or can open out to increase the horizontal cross section of the chamber. Usually, in the upper part, the cross section presents a curved shape close to a circular section.

Usually the top of the chamber is at least partially opened. Soluble beverage ingredient can be introduced in the chamber through the opened top by gravity fall.

The chamber comprises a bottom wall. This bottom wall comprises the beverage outlet.

The cylindrical lateral side wall comprises the liquid inlet. This liquid inlet is positioned in the lower part of the chamber that is essentially cylindrical. Accordingly the chamber is filled with liquid from the bottom.

The liquid inlet is configured so that the liquid is introduced in the chamber under the form a straight jet of liquid. By jet, it is understood a stream of liquid that comes out of the liquid inlet and in the chamber quickly and with force. So the liquid inlet is configured for introducing liquid in the inner chamber with a high velocity. Usually, this straight jet is produced by and emerges from a nozzle positioned in the liquid inlet of the lateral wall of the chamber. Accordingly, the liquid inlet preferably comprises a nozzle.

According to a less preferred embodiment, the nozzle can be designed inside the cylindrical lateral side wall. Consequently, the chamber and the nozzle can be made of one single piece of material.

The size of the liquid nozzle outlet, the diameter of the chamber and the pressure of the liquid are generally adapted accordingly to get the high velocity of the jet and the swirling effect for liquid.

Generally, the nozzle presents an outlet section with a surface area equivalent to the surface of a circular surface of diameter comprised between 0.2 and 0.8 mm, preferably between 0.3 and 0.5 mm and even more preferably of about 0.4 mm.

With such a dimension, the delivery of water at a pressure comprised between 2 and 10 bar, preferably of at least 6 bar, in the nozzle enables the production of a jet of high velocity and the production of the swirl in the chamber such as disclosed herein.

Optionally, a second liquid inlet can be placed near the top of the chamber. It aims at introducing further liquid in the case the chamber would be used for producing a beverage with no foam. It enables a final rinsing of the chamber too.

The liquid inlet is also oriented so that the straight jet of liquid extends transversely through the internal volume of the chamber along a line L, said line L being offset relative to the longitudinal central axis of the chamber.

More specifically, the line L is oriented in a direction so that a ratio $d/r_0$ is comprised between 0.2 and 0.4, preferably is of about 0.3, where $r_0$ is the radius of the cylindrical lateral side wall of the chamber and d is the distance measured orthogonally from the line L to the central longitudinal axis of the chamber.

At the area of the cylindrical lateral side wall opposed to the liquid inlet and crossed by the line L, the chamber comprises a bump raising from the surface of the cylindrical lateral side wall and extending in the internal volume of the chamber.

The shape of the bump is designed to convert the introduced straight jet of liquid extending transversely through the internal volume of the chamber into a swirl flowing along the lateral side wall off the chamber. The bump initiates the transformation of the straight jet originally oriented to hit the lateral wall of the chamber into a swirl sliding along said lateral side wall of the chamber.

In addition, the bump is shaped to act on the swirl of liquid at the moment where this swirl flows back to the bump in order to increase the mixing effect between the jet of liquid entering the chamber and the swirl. This result is obtained by two effects. First, the bump guides the swirl in order to reduce its diameter which enables the swirl to be strongly hit again by the jet of liquid still entering the chamber and reaching the bump on the chamber side opposed to the liquid inlet. In addition to the effect of reducing the diameter of the swirl, the bump is designed to reorientate the swirl in the direction of the liquid inlet to provide an even stronger mixing.

According to the preferred embodiment, the bump presents two lateral at least partially curved sides, each sides extending gradually from the cylinder defined by cylindrical lateral side wall inside the volume of the chamber and converging at a central common essentially vertical edge.

The first side is crossed by the line L. Consequently, after traversing the chamber, the jet of liquid hits this first side and this first side is shaped to guide the jet of liquid entering the chamber.

The first side guides the liquid in a direction starting from a leading part end—corresponding to the part where the liquid enters in contact with the first side—to a trailing part end—corresponding to the part where the liquid leaves the first side.

In the first side:
the leading part end is oriented so that the angle between said part end and the line L is of at most 45°, preferably at least 10°. This leading part end avoids the splashing of the jet against the cylindrical lateral side wall of the chamber that is positioned almost perpendicularly to the jet. The jet of liquid slides more gently along the leading part end.
the trailing part end is curved and tangent to the cylindrical lateral side wall. As a result, the liquid is guided continuously to the cylindrical wall and the swirl is created. This orientation helps the conversion of the straight jet in a swirl.

Similarly, the second side guides the swirl of liquid in a direction starting from a leading part end—corresponding to the part where the swirl enters in contact with the second side—to a trailing part end—corresponding to the part where the swirl leaves the second side.

In the second side:
the leading part end is curved and is tangent to the cylindrical lateral side wall. Consequently, the curvature guides water away from the cylindrical wall and simultaneously reduces the diameter of the swirl. The change of direction is smooth.
the edge of the trailing part end—which corresponds to the common edge of the two curved surfaces of the bump—is positioned at a distance $d_2$ from the longitudinal central axis of the chamber that is inferior to the radius $r_0$ of the cylindrical side wall of the chamber, preferably comprised between 0.5 $r_0$ and 0.9 $r_0$. As a result, the diameter of the swirl decreases while it passes through the jet of liquid still entering inside the chamber.
the trailing part end is oriented so that the angle between said trailing part end and the line L is of at most 90°, preferably at least 30°. This orientation provides an impulsion to the swirl redirecting them in direction of the entering jet of liquid.

Preferably, the first side is positioned relatively to the line L so that line L crosses the first side at the middle distance between the two edges of the first side. Accordingly, depending on the shape of the jet (e.g. conical shape of the jet), it is guaranteed that the whole jet is guided by the first side and not a part only.

According to one first mode, the first side is an arc and said arc presents a radius $r_1$ equal to the radius $r_2$ of the arc of the second side of the bump.

According to one second mode, the first side is the combination of an arc at the trailing part end and a flat surface at the leading part end and the radius $r_4$ of the arc is inferior to the radius $r_2$ of the arc of the second side of the bump.

Generally, the second side is an arc and this arc presents a radius $r_2$ inferior to the radius $r_0$ of the cylindrical side wall of the chamber.

Preferably the centre $O_2$ of the arc forming the second side is positioned at a distance doe from the central axis of the cylindrical side wall of the chamber equal to the distance $d_2$ between the trailing end of said second side and the central axis of cylindrical side wall of the chamber.

Preferably, the radius $r_2$ of the arc of the second side is inferior to the distance $d_2$ between the trailing end of said second side and the central axis of the centre of cylindrical side wall of the chamber.

According to one embodiment, the line L can be oriented horizontally.

According to another preferred embodiment, the line L can be inclined downwardly. The line L can be inclined by angle of at most 30° with horizontal. Depending on the position of the diluent inlet in the lateral side wall, the angle is set so that the line crosses the area of the lateral side wall opposed to the diluent inlet at a position above the bottom wall of the chamber.

Generally, the beverage outlet is a straight conduit, preferably vertically oriented, and this conduit is subdivided in at least two, preferably four straight equal sub-conduits.

According to one embodiment, the conduit can be subdivided by a removable divider, which enables cleaning. Preferably the divider presents a cross section dividing the conduit in four equal channels.

For such a divider presenting a cross section dividing the conduit in four equal channels, preferably, the length of the conduit of the beverage outlet is greater than the diameter of the beverage outlet, preferably greater than two times the diameter of the beverage outlet.

According to one embodiment, the position of the beverage outlet is offset the longitudinal central axis of the cylindrical lateral side wall of the chamber. Such an embodiment is preferred in a beverage preparation apparatus comprising at least two chambers, and wherein the beverage outlets of the chambers emerge in the same area. Such multiple chambers are used for the preparation of drinks comprising several beverage components such as coffee and foamed milk, both beverages being introduced in the same drinking receptacle.

Preferably, the bottom wall of the chamber is inclined in respect of horizontal in direction of the beverage outlet in order to facilitate the full dispensing of the beverage.

Generally, the apparatus comprises a liquid supply system connectable to the liquid inlet.

The liquid can be any suitable liquid adapted for dissolving a beverage soluble ingredient using the features and conditions of the device. A preferred liquid is water either hot or cold. Generally the liquid supply system of the beverage production machine comprises at least a liquid tank or liquid supply, a liquid pump, a liquid heater and/or cooler and a valve for actuating the liquid delivery. The system can also comprise a selection valve for delivering liquid at either hot or cold temperature.

Generally the beverage preparation apparatus comprises a receiving area in order to removably position the chamber inside the apparatus and to connect the chamber liquid inlet to the liquid supply system. Accordingly the chamber can be removed for cleaning and maintenance.

Preferably, the beverage preparation apparatus comprises a dosing device configured for dispensing a dose of soluble beverage ingredient in the chamber.

Generally the dosing device is placed above the chamber in order to feed it by gravity fall. The dosing device can be associated to a powder reservoir or a liquid concentrate reservoir. In a variant, the apparatus can be devoid of dosing device and beverage ingredient reservoir. Then, beverage ingredient can be introduced in the chamber manually.

According to a second aspect, there is provided a method for producing a beverage in a beverage preparation apparatus such as described above, said method comprising the steps of:

dosing the chamber with soluble beverage ingredient, and introducing a liquid through the liquid inlet.

The dosing of the ingredient is usually automatic and controlled by a controller of the apparatus. Yet, in a particular mode, the dosing of the ingredient can be manually made by manual actuation of a dosing device or with a spoon and beverage ingredient jar or with a stick pack.

Preferably, the chamber is dosed with soluble beverage ingredient before a liquid is introduced in the chamber.

The soluble beverage ingredient can be selected in the list of soluble coffee (instant coffee) powder, chocolate powder, milk powder and mixtures thereof. Mixtures of sugar, instant coffee and milk powder known as coffee mixes can also be used. Other soluble powder ingredients like soluble tea, dehydrated culinary ingredients and/or milk based ingredients can be used. The device and the method of the present invention are applicable too to the dissolution of liquid concentrates with a liquid. Such liquid concentrates may be coffee, chocolate, tea or milk concentrates or syrups.

In the present application the terms "internal", "top", "bottom" and "lateral" are used to describe the relational positioning of features of the invention. These terms should be understood to refer to the chamber in its normal orientation when positioned in a beverage preparation dispenser for the production of a beverage as shown in the FIG. 1, 2, 4, 5, or 6.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
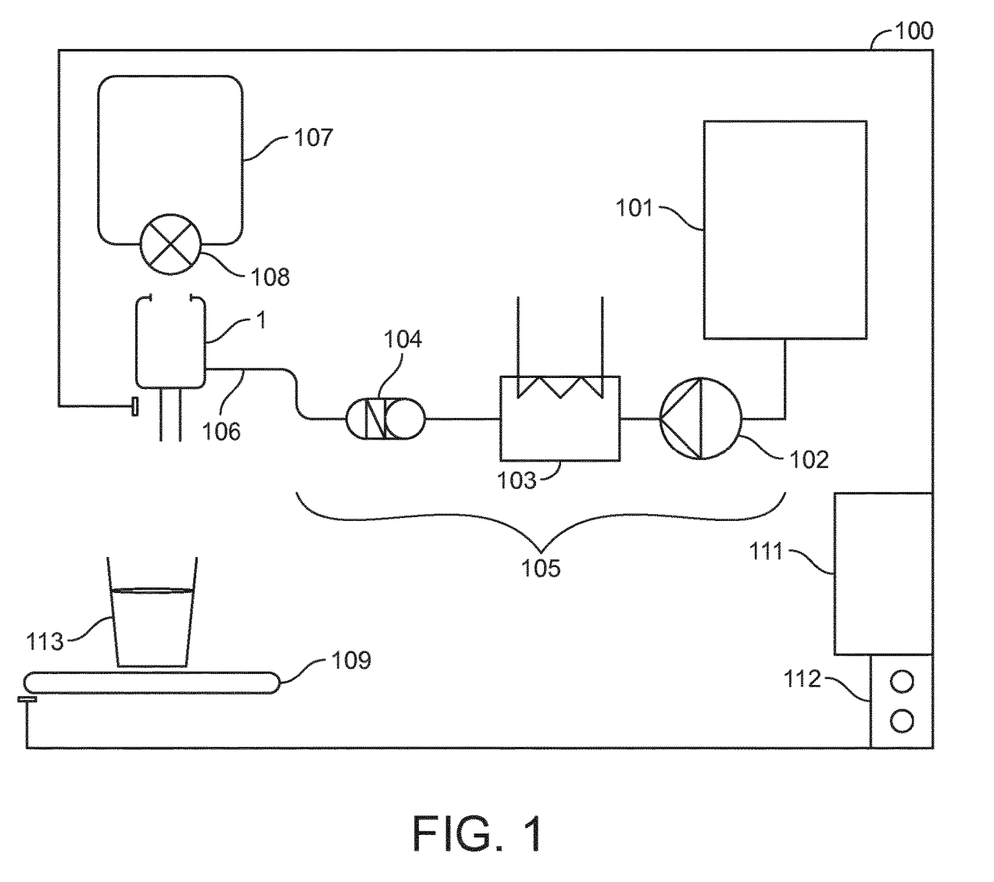
FIG. 1 is a schematic view of a beverage preparation apparatus according to the present invention.

FIG. 1 illustrates a beverage preparation apparatus 100. The apparatus includes a mixing chamber 1 for producing a beverage from a soluble beverage ingredient and liquid, preferably water, entering the chamber.

The beverage ingredient is stored in a container 107. The container can be a hopper which is permanent or a disposable package containing the beverage ingredient.

A dose of beverage ingredient is metered and dispensed by a dosing device 108. The dosing device has the primary function to meter upon request doses of ingredient into the mixing chamber 1. The dosing device dispenses the dose of beverage ingredient in mixing chamber 1, generally by gravity fall in a top opening of the chamber.

The dosing device can be any suitable system such as a dosing screw, a reciprocating dosing piston or a rotating disc. The dosing technology is also of course dependent on the nature of the soluble ingredient. The soluble ingredient is typically a dry beverage powder, preferably mild powder. However, it could also be a liquid concentrate such as milk concentrate. The device is fed upon request with ingredient manually or automatically as prompted by a controller 111 and command 112.

When the beverage ingredient is a powder, this dosing device can be a rotating device such as described in WO 2009/144239.

According to a particular embodiment (not illustrated), the beverage preparation apparatus can be deprived of reservoir and dosing device. Accordingly, the user can introduce a dose of ingredient in the chamber manually using a spoon or a stick of powder.

A liquid, preferably water, supplying system 105 is provided in the machine to be able to feed water in the mixing chamber 1, more particularly, hot water.

The water supplying system comprises:
- a tank 101 that can be replenished with fresh water, or eventually connected to tap water,
- a water pump 102 for pumping water from the tank 101. The pump can be any type of pump such as a piston pump, diaphragm pump or a peristaltic pump.
- a water heater 103 such as a thermoblock or a cartridge type heater to heat the pumped water, alternatively or in addition to, the machine can comprise a water cooler in a line bypassing the heater,
- a non-return valve 104.

Finally water is fed into the mixing chamber by a tube 106. In a variant, not illustrated, water can be fed by two tubes 106 in two different inlets of the chamber.

As illustrated in FIG. 1, the mixing chamber 1 can be placed directly above a service tray 109 onto which is placed a drinking receptacle 113 to receive the beverage. Generally, the mixing chamber 1 is removable from the machine for cleaning and optionally for dosing. Usually the machine comprises a mixing chamber receiving area to removably fix the chamber inside and provide cooperation between the mixing chamber liquid inlet(s) and the liquid supply tube(s) 106.

Usually, the chamber 2 is immobile within the apparatus. Yet, in a less preferred embodiment, the mixing chamber 1 can be movable to a position placed under the dosing device 108 as described in WO 2009/153157.

The controller 12 can coordinate dosing of the soluble beverage ingredient by the dosing device 108 and dosing of liquid by the pump 102 upon the user actuating or being prompted to press the command 112 on the apparatus.

Figure 2:
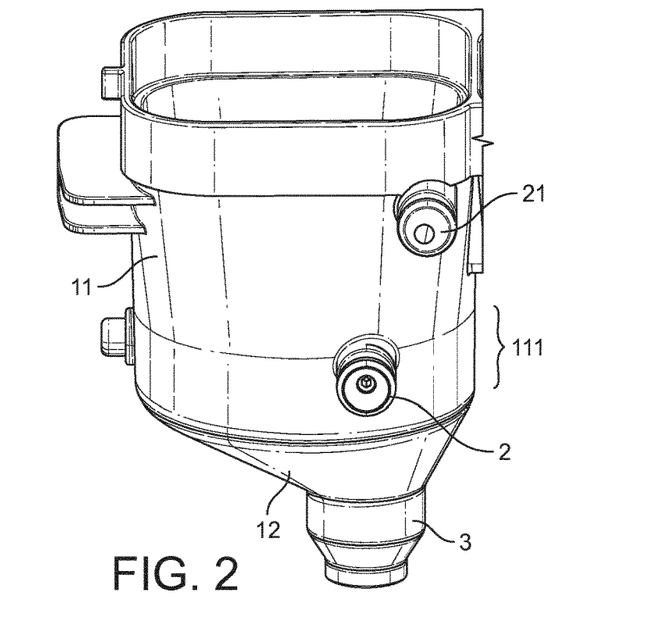
FIG. 2 is a perspective view of a chamber used in the apparatus of the present invention
Figure 3:
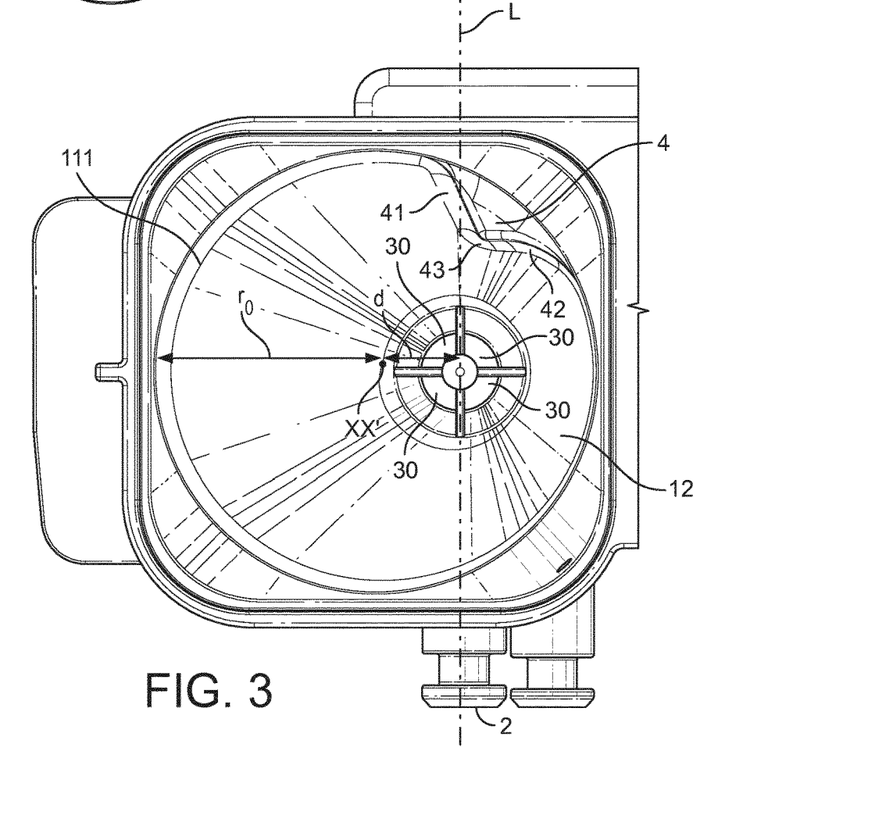
FIG. 3 is a top view of the chamber of FIG. 2.

FIG. 2 is a perspective view of a chamber 1 according to the invention used in a beverage preparation apparatus such as described in FIG. 1, but not limited to. FIG. 3 is a top view of this chamber The chamber 1 comprises a lateral side wall 11 and a bottom wall 12. These walls define an internal volume able to contain a liquid. The lower part 111 of the lateral side wall is cylindrical. This lower part comprises the diluent inlet 2 and the bump 4 as described later. The upper part of the lateral side changes progressively to the cross section of a square with rounded corners. This upper shape enables an increase of the internal volume of the chamber. It does not affect the preparation of the beverage that essentially happens in the lower part of the chamber.

Preferably, the cylindrical lateral side wall 11 is such that its longitudinal distance (height) is close to its cross section dimension (diameter). Consequently, the internal volume of the chamber sufficiently large without increasing the height of the chamber and, as a result. the height of the apparatus. The diameter can be comprised between 40 and 70 mm and the height between 40 and 80 mm. The internal volume is generally set so as to be able to hold a volume of liquid comprised between 40 and 100 ml.

The cylindrical lateral side wall 11 comprises a liquid inlet 2. This liquid inlet 2 is positioned close to the bottom wall 12 of the chamber. Generally, the distance between the bottom of the chamber and the central axis of the liquid inlet is comprised between 5 and 20 mm.

Figure 4:
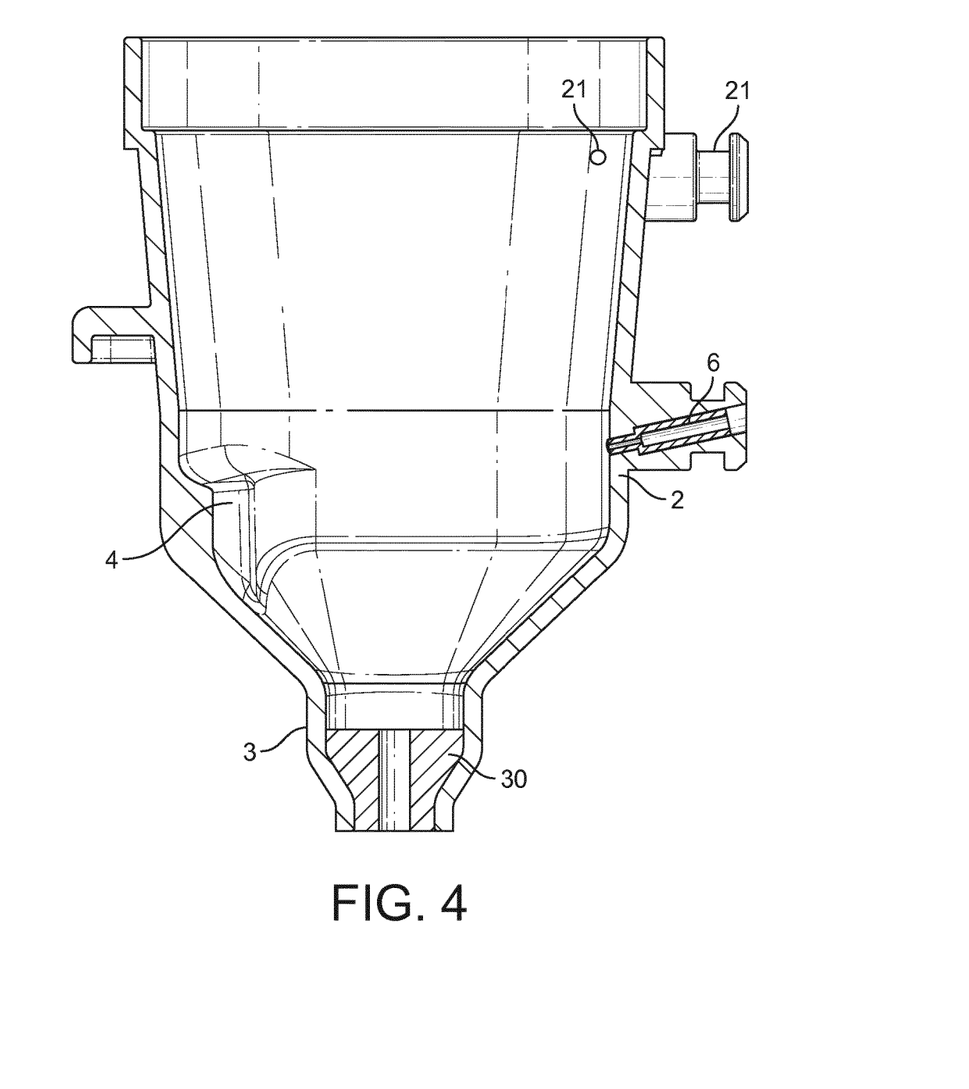
FIG. 4 is a vertical cross section of the chamber of FIG. 2 along the plane traversing the liquid inlet FIG. 5a corresponds to FIG. 4, the divider of the beverage outlet being removed.

This liquid inlet 2 is configured so that the liquid is introduced in the chamber as a straight jet of liquid. Preferably, this straight jet is produced by and emerges from a nozzle 6 positioned in the liquid inlet of the chamber as illustrated in FIG. 4 that is a vertical cross section of the chamber traversing the liquid inlet.

The liquid inlet is also configured so that the straight jet of liquid extends transversely through the internal volume of the chamber along a line L, said line L being offset relative to the longitudinal central axis XX' of the chamber, as illustrated in the top view of the chamber in FIG. 3.

More specifically, the line L is oriented in a direction so that a ratio $d/r_0$ is comprised between 0.2 and 0.4, preferably of about 0.3, where $r_0$ is the radius of the cylindrical lateral side wall 11 and d is the distance measured orthogonally from the line L to the central longitudinal axis XX' of the chamber.

The nozzle 6 positioned in the liquid inlet 2 is designed for producing a straight jet of liquid. According to another embodiment, the nozzle can be moulded in the liquid inlet that is in the chamber lateral side wall.

Generally, the nozzle presents an outlet section with a surface area equivalent to the surface of a circular surface of diameter comprised between 0.2 and 0.8 mm, preferably between 0.3 and 0.5 mm and even more preferably of about 0.4 mm. With such a dimension, the delivery of water at a pressure comprised between 2 and 10 bar, preferably of at least 6 bar, in the nozzle enables the production of a jet of high velocity.

In the illustrated embodiment, the liquid inlet is also configured so that the straight jet of liquid is inclined downwardly in direction of the opposed surface of the lateral cylindrical wall. When the soluble beverage ingredient is a powder and the beverage preparation requires a certain amount of powder, the powder is usually dosed before the liquid is introduced in the chamber. In that case, the inclined jet of liquid flows directly down the heap of powder which reduces the risk of powder flowing through the whole chamber and the creation of lumps. This is particular critical when the flow rate of the pump of the beverage preparation apparatus cannot be controlled. In the case where the pump can control this flow rate, the flow can be progressively increased at the beginning of the introduction of the liquid in order to avoid powder hitting. In that case, the inclination of the liquid inlet is not necessary and the jet can be oriented horizontally.

The chamber comprises an optional second liquid inlet 21 at the top of the chamber. This second liquid inlet can be used to rinse the chamber or to prepare a non-frothed beverage.

The chamber comprises a beverage outlet 3. This outlet is a conduit positioned at the lowest position of the bottom wall 12 of the chamber. The bottom wall 12 presents the shape of a funnel inclined in direction of the conduit.

Figure 6:
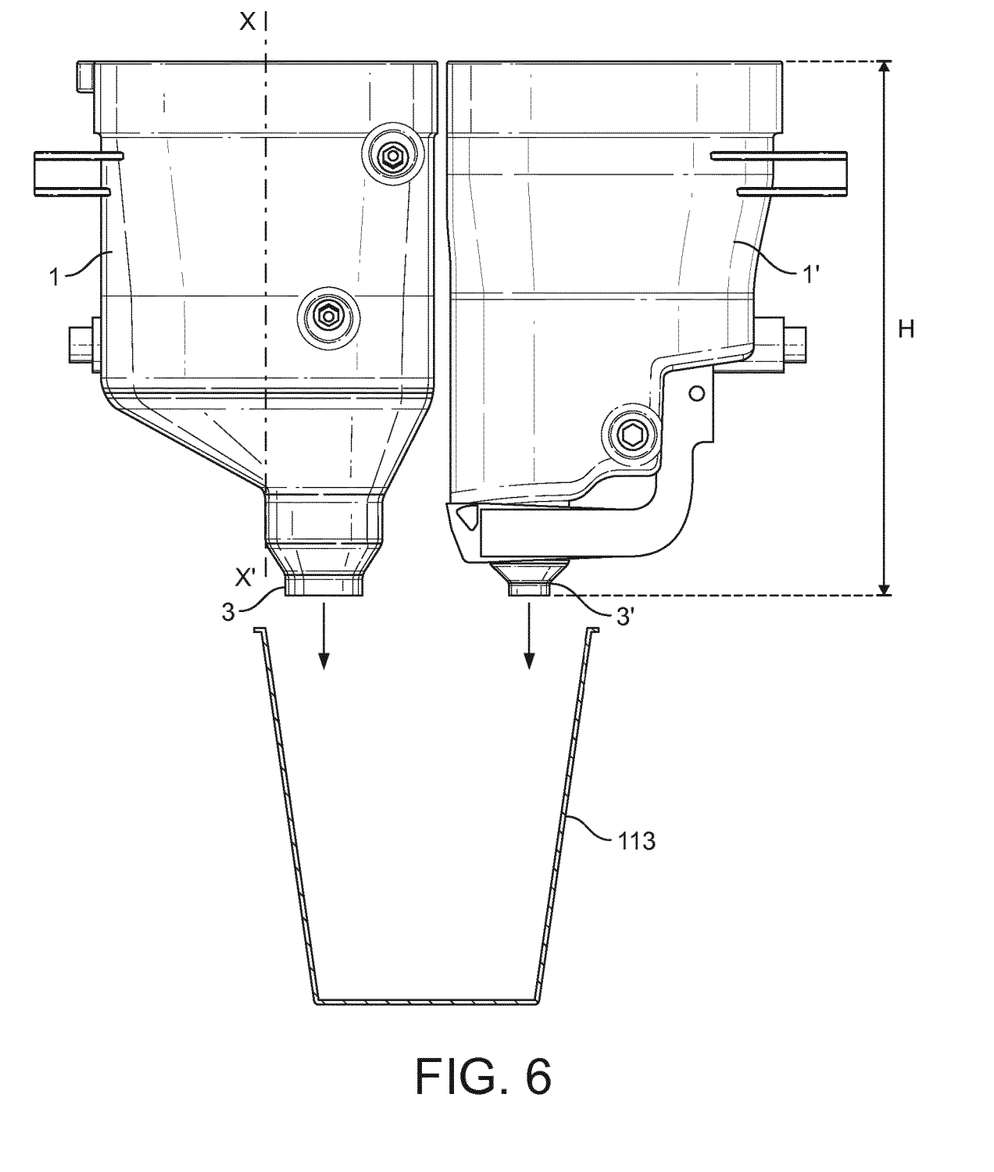
FIG. 6 is an illustration of two chambers positioned aside.

The conduit is not centred on the longitudinal central axis XX' of the cylindrical lateral side wall chamber but is offset. This illustrated embodiment enables the dispensing of the beverage in a receptacle 113 positioned to receive a beverage from a beverage dispensed from the outlet 3' of another chamber 1' positioned aside the chamber 1 as illustrated in FIG. 6.

In another embodiment wherein there is no such constraint, the chamber the conduit of the beverage outlet can be centred on the longitudinal central axis XX' of the chamber.

The diameter of the conduit of the beverage outlet is sufficiently large to enable the rapid dispensing of a large quantity of the beverage. Preferably, the hydraulic diameter of the conduit of the beverage outlet is of at least 2 mm.

As illustrated in FIGS. 3 and 4, the conduit is subdivided in four straight sub-conduits 30 by means of a divider 31. This divider prevents the rotation of the swirling beverage inside the beverage conduit which has the effects of slowing down the dispensing and not enabling the dispensing of the beverage as a straight flow in the drinking receptacle. The divider is removable from the chamber for cleaning.

In that configuration of the divider, preferably, the length Lo of the conduit of the beverage outlet is greater than the hydraulic diameter $D_0$ of the beverage outlet, preferably greater than two times the hydraulic diameter of the beverage outlet. In the illustrated embodiment, the length of the conduit is of about 5 mm and the hydraulic diameter $D_0$ of the conduit is of about 2 mm. By hydraulic diameter, it is meant the diameter of a conduit with round section presenting the same cross section area as a conduit with a section of a different shape.

Coming back to the embodiment illustrated in FIG. 6, it is noticeable that the two chambers present the same external height. This feature is particularly interesting when the apparatus comprises dosing devices to feed soluble beverage ingredient through the tops of the chamber. Actually these dosing devices can be positioned at the same height and the global footprint and height of the apparatus can be reduced. Eventually a common actuator can be used and the general architecture optimised. Specifically, when the apparatus is configured for preparing coffee and milk beverages with the chamber 1 dedicated to milk and the chamber 1' dedicated to coffee, this requires that the milk chamber 1' is larger than the coffee chamber 1 to be able to produce bigger volume of beverage with a chamber of fixed height H. The particular internal design of the chamber 1 reaches this objective.

Figure 5A:
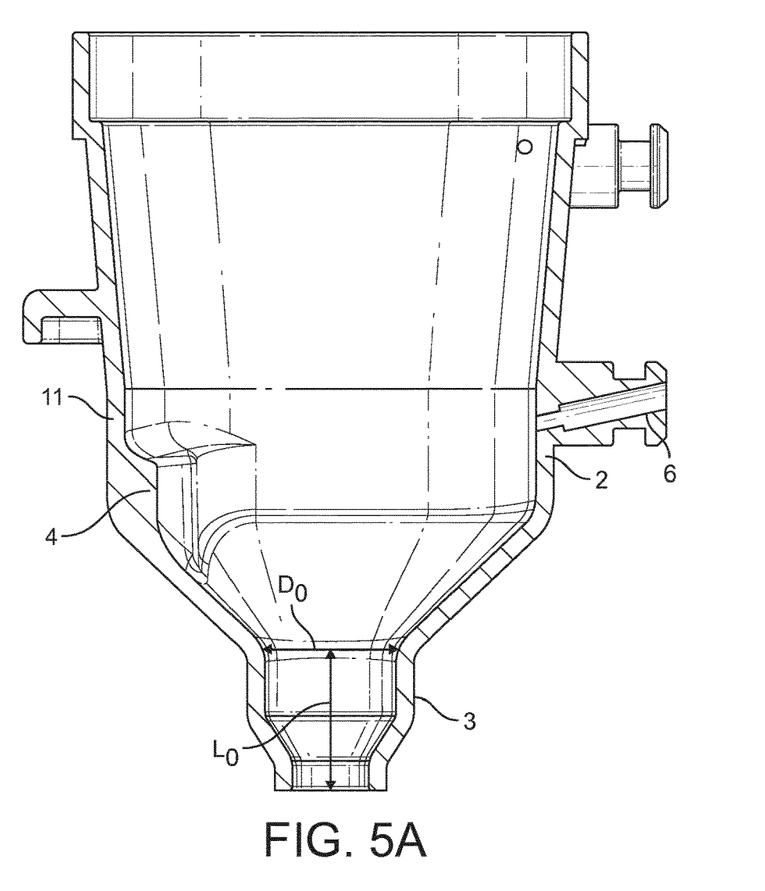
Figure 5B:
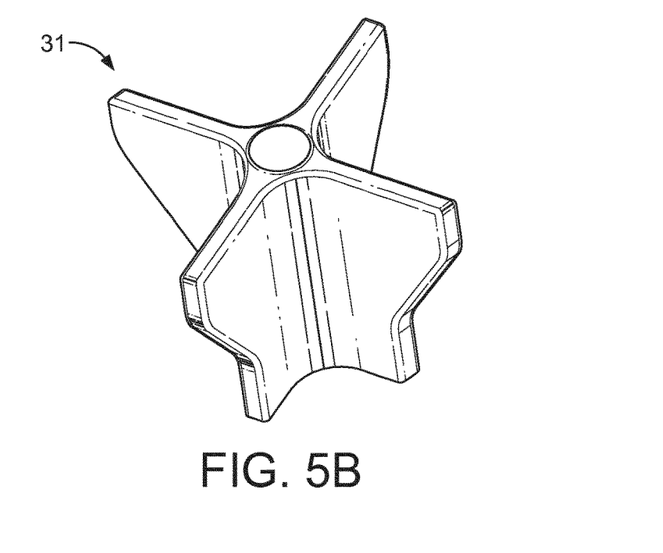
FIG. 5b is a perspective view of the divider.
Figure 7:
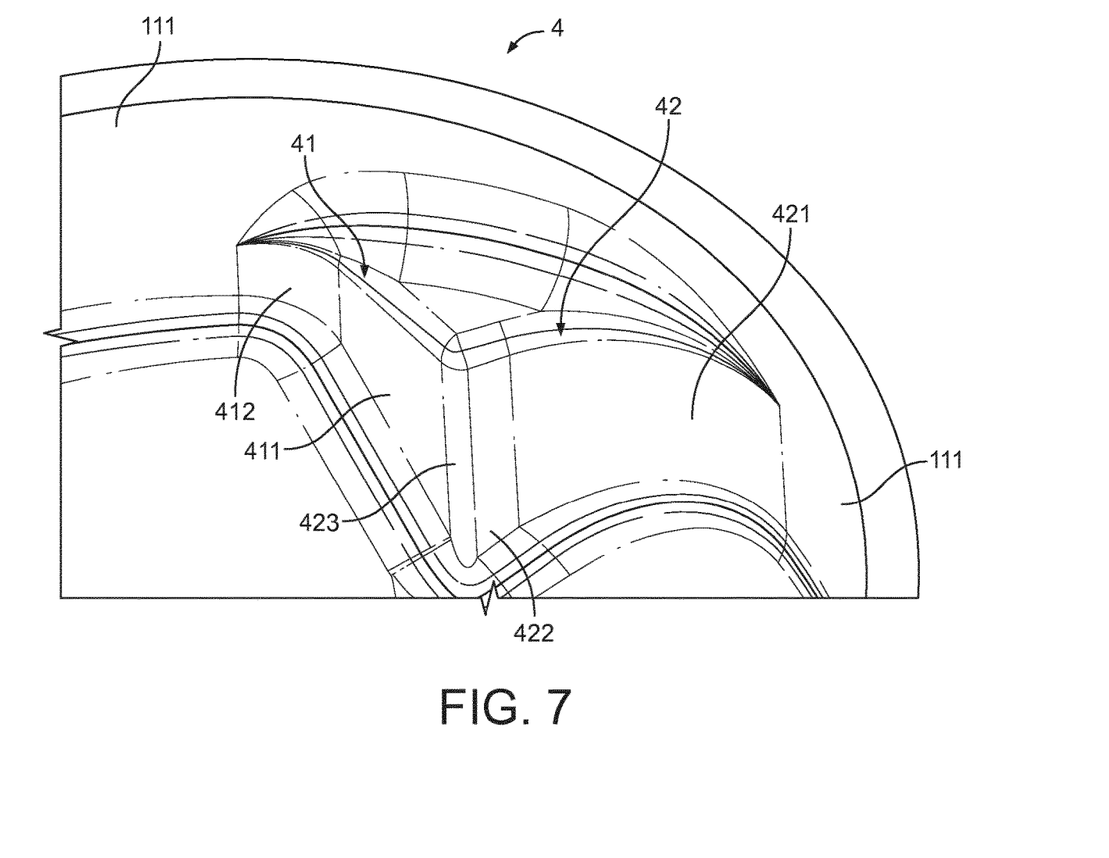
FIG. 7 is a magnified view of the bump of the chamber illustrated in FIG. 2, FIGS. 8a-e are schematic illustrations of the chamber according to the invention.

As illustrated in FIGS. 3, 4, 5a and in FIG. 7 the chamber comprises a bump 4 extending from the lateral surface of the chamber inside the volume of the chamber. This bump 4 is positioned at the area of the cylindrical lateral side wall 111 opposed to the liquid inlet.

The bump 4 presents two lateral at least partially curved sides 41, 42. Each side extend gradually from the surface cylinder in opposite directions and converge at a central common essentially vertical edge 43.

According to the preferred embodiment, the bump presents two lateral curved parts 412, 421, each curved sides extending gradually from the cylinder defined by cylindrical lateral side wall (in opposed directions) inside the volume of the chamber and converging at a central common essentially vertical edge 423.

Figures 8A, 8B:
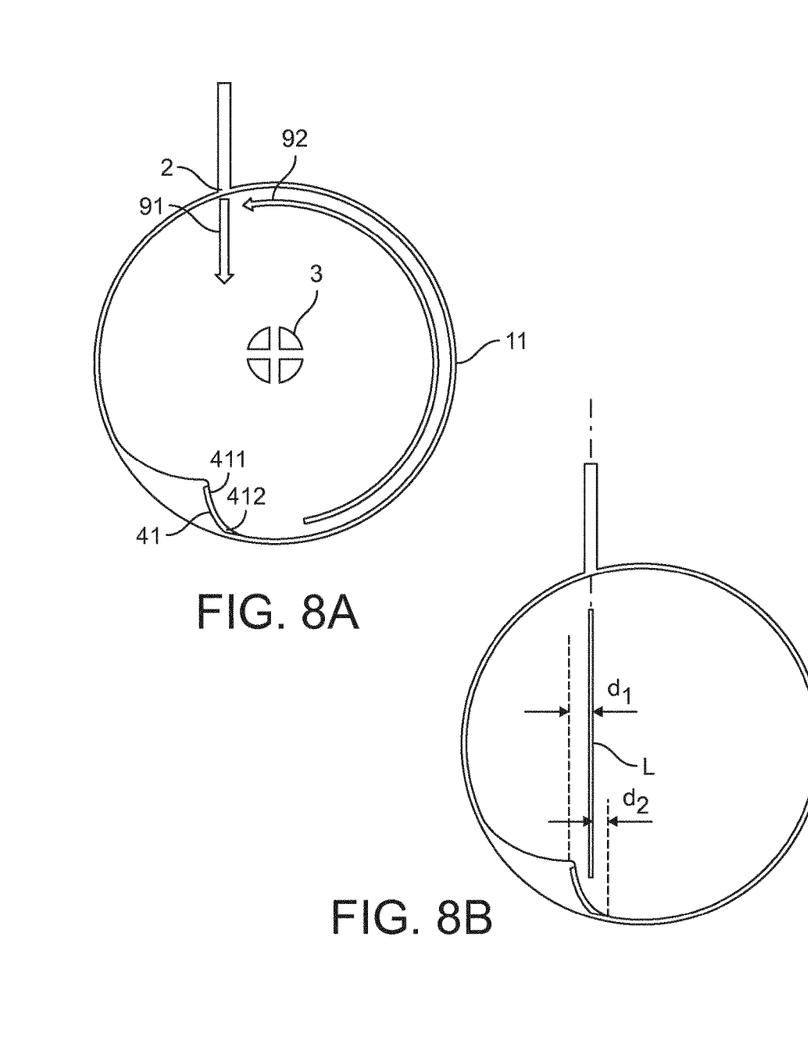
Figure 8C:
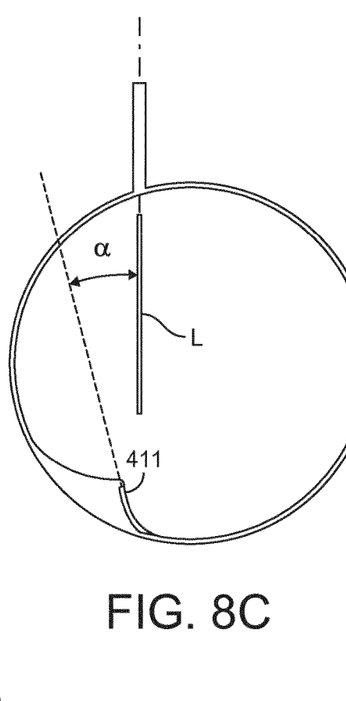

FIGS. 8a-c are top views of the chamber used to schematically illustrate the features and functions of the first side 41.

The first side guides the liquid in a direction starting from the leading part end 411—corresponding to the part where the jet enters in contact with the first side—to a trailing part end—corresponding to the part where the liquid leaves the first side 41.

As illustrated in FIG. 8b, the first side 41 is crossed by the line L meaning that the straight jet of liquid hits the first side 41 and in particular the leading part end 411.

Preferably, the first side 41 is positioned relatively to the line L so that line L crosses the first side at the middle distance between the trailing edge 412 and the leading edge 411 of the first side. The distance $d_1$ between the line L and the edge of the leading part end 411 is essentially identical to the distance $d_2$ between the line L and the edge of the trailing part end 142. Accordingly, depending on the shape of the jet (e.g. conical shape of the jet), the first side is positioned to hold and guide the whole cross section of the jet. Generally the cross section surface of the jet when it impacts the first side 41 is linked to the liquid inlet cross section, the flow rate of the liquid and the distance between the diluent inlet and the bump. Based on these features, the distances $d_1$ and $d_2$ are preferably defined so that each of these distances are superior to three times the diameter of the jet at the point of impact. Similarly the height of the bump and the vertical position of the pump in the chamber relatively to the line L are set so that the whole cross section of the jet hits the bump.

As shown in FIG. 8c, this leading part end 411 is oriented so that the angle α between said part end and the line L is of at most 45°, preferably at least 10°. This orientation avoids the splashing of the jet against the cylindrical lateral side wall 11 of the chamber; the jet of liquid slides more gently along the leading part end.

After hitting the leading part end 411, the flow of liquid is guided by the curved trailing part end 412 that is tangent to the cylindrical lateral side wall 11. Accordingly, there is perfect control of the flow of liquid from a straight jet to a swirl.

This curved trailing part end 412 initiates the creation of the swirl although the chamber is larger compared to usual ones: as a result, a nozzle and a pump comparable to those used in the state of the art can be used and the cost of manufacturing of the apparatus can remain low.

Figure 8D:
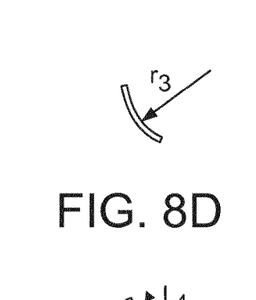

According to one first mode illustrated in FIG. 8d, the first side 41 can be an arc. This arc can present a radius $r_1$ equal to the radius $r_2$ of the arc of the second side of the bump (illustrated in FIG. 8d).

Figure 8E:
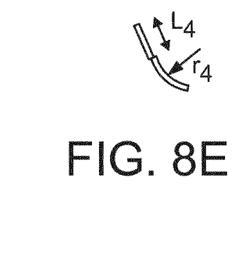

According to one second mode illustrated in FIG. 8e, the first side 41 can be the combination of an arc at the trailing part end and a flat surface at the leading part end.

Preferably the radius $r_4$ of the arc is inferior to the radius $r_2$ of the arc of the second side of the bump.

Once the flow of liquid leaves the first side 41, this flow swirls along the cylindrical surface 11 of the lateral wall of the chamber. When the swirl 92 flows in front of the liquid inlet 2 (see FIG. 8a), it is hit by the entering straight jet 91 of liquid inducing a strong agitation and aeration of the liquid in the swirl with the effect of increasing dissolution and foaming.

FIGS. 9a-d are top views of the chamber used to schematically illustrate the features and functions of the second side 42.

The second side guides the swirl in a direction starting from the leading part end 421—corresponding to the part where the swirl enters in contact with the first side—to a trailing part end 422—corresponding to the part where the swirl leaves the second side 42.

Figures 9A, 9B, 9C, 9D:
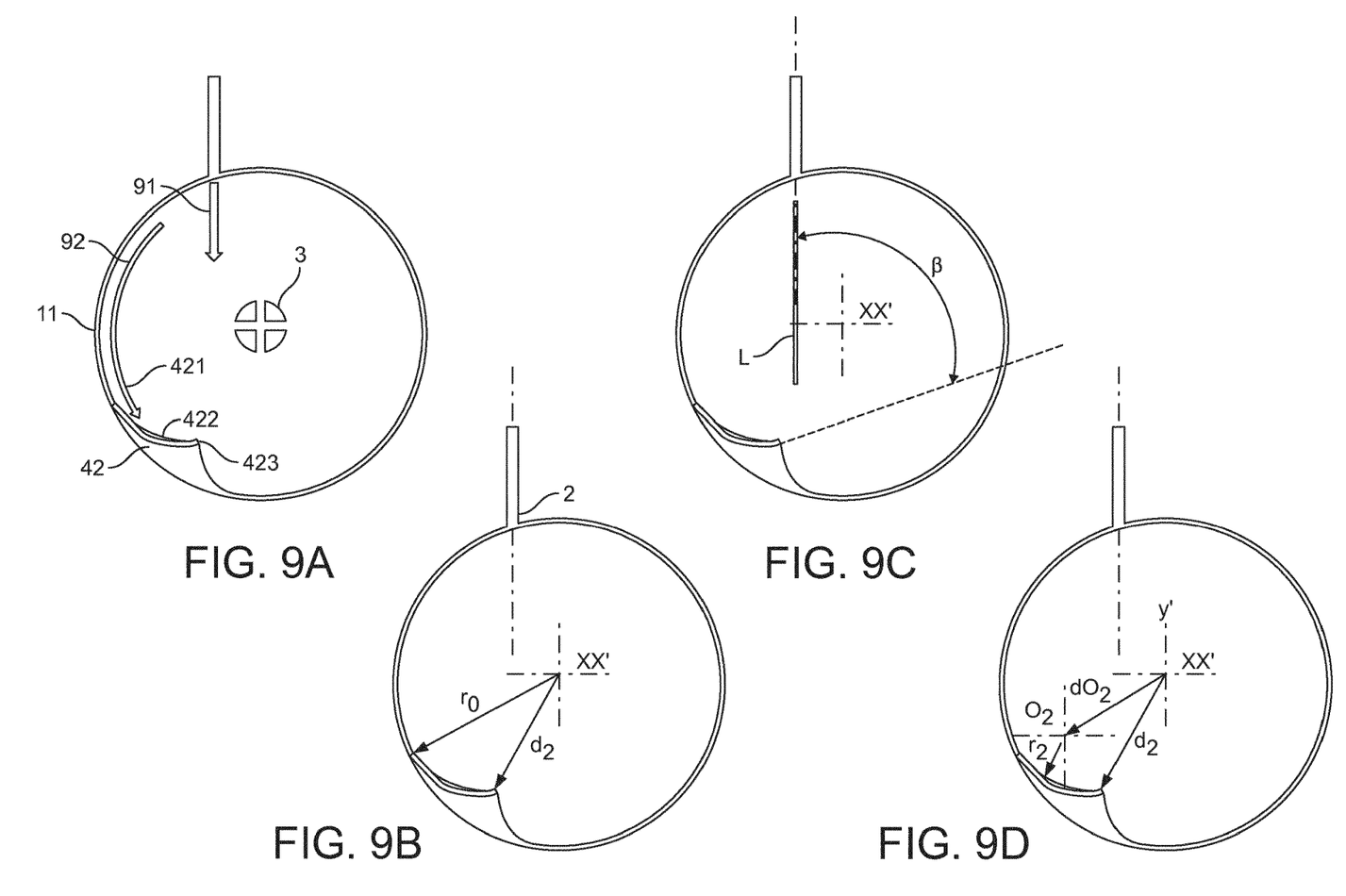
FIGS. 9a-d are schematic illustrations of the chamber according to the invention.

After the swirl 92 has flown in front of the liquid inlet 2, the swirl 92 reaches the second side 42 of the bump as illustrated in FIG. 9a. This second side 42 comprises a curved leading part end 421 tangent to the cylindrical lateral side wall 11, as a result, the curvature guides the swirl of liquid gently away from the cylindrical wall 11. Simultaneously, the curved leading part end 421 reduces the diameter of the swirl.

Following the leading part end, the flow reaches the edge 423 of the trailing end part of the second side—at the common edge of the two curved surfaces of the bump. As illustrated in FIG. 9b, this edge 423 is positioned at a distance $d_2$ from the longitudinal central axis of the chamber that is inferior to the radius $r_0$ of the cylindrical side wall of the chamber, preferably comprised between 0.5 $r_0$ and 0.9 $r_0$. As a result, the swirl is induced to get closer to the liquid inlet 2. Specifically, the position of this edge 423 guarantees that the diameter of the swirl decreases while it passes through the jet of liquid still entering inside the chamber. The effect is that the swirl is reached again by the jet of liquid 91 still entering the chamber and is agitated and aerated again. Although the chamber is rather large to enable the preparation of a large volume of beverage, the second side of the bump is configured to bring closer the swirl 92 to the jet of liquid 91 entering the chamber. At the point where they cross, that is at the edge 423, the strength of the entering jet remains high since this position at the edge 423 is closer to the liquid inlet 2 than the part of the cylindrical lateral wall opposed to the liquid inlet, then the shearing of the swirl is more efficient.

In addition, as illustrated in FIG. 9c, the trailing part end 422 is oriented so that the angle β between said trailing part end and the line L is of at most 90°, preferably at least 30°. This specific orientation provides an impulsion to the swirl and straighten up the swirl in direction of the entering jet 91 of liquid as illustrated in FIG. 9a. The result is an increased shearing of the swirl by the jet again.

Usually, the second side 42 is an arc and this arc presents a radius $r_2$ inferior to the radius $r_0$ of the cylindrical side wall of the chamber.

Preferably the centre $O_2$ of the arc forming the second side 42 is positioned at a distance doe from the central axis XX' of the cylindrical side wall of the chamber equal to the distance $d_2$ between the edge 423 of the trailing part end of said second side and the central axis XX' of cylindrical side wall of the chamber.

Preferably, the radius $r_2$ of the arc of the second side is inferior to the distance $d_2$ between the trailing end of said second side and the central axis of the cylindrical side wall of the chamber.

The apparatus with the above described chamber enables the rapid preparation of an important volume of frothed beverage such as foamed milk.

Once the beverage ingredient has been dosed in the chamber, the liquid is injected in the chamber too. In the first period of the liquid injection, the bump 4 enables the creation of the swirl 92 of liquid, that is agitated and aerated by the entering jet 91 of liquid. In addition, although the chamber is designed with dimensions large enough in order to prepare an important volume of beverage, the swirl 92 can still be hit again with force by the entering jet 91 of liquid a second time providing again an efficient agitation. Consequently, the chamber design enables the efficient dissolution of the ingredient and the frothing of the beverage from the beginning of the process. That provides the advantage of immediately producing an important quantity of foam in the beverage.

Very rapidly, all the beverage ingredient is dissolved in the liquid and the rest of the process is only a matter of dissolution with liquid that is still being introduced and of frothing. As liquid goes on entering the chamber, the swirl raises inside the chamber and above the diluent inlet. Above the diluent inlet, the swirl enables the mixing of the beverage in preparation. At the diluent inlet, the strength of the jet goes on agitating and aerating the swirl, yet the generation of new foam becomes less important because the surface air/liquid is above the diluent inlet.

After a certain time, the volume of liquid in the chamber is such that the bottom of the swirl reaches the beverage outlet and the dispensing in the drinking receptacle starts. From this time, the dispensing of beverage happens simultaneously to the introduction of liquid until the volume of liquid set for the recipe is reached. Once the liquid stops entering the chamber, the rotation of the swirl decreases and the beverage is fully evacuated.

The design of the chamber enables the preparation of a large volume of frothed beverage.

The apparatus presents the advantage of presenting a compact aspect in particular a small height although it comprises a chamber with larger internal volume.

The apparatus presents the advantage of not comprising costly internal devices such as whipping motors to strongly agitate the beverage or a high pressure pump to supply a high pressure jet. The particular shape of the chamber is enough to guide efficiently the jet, produced by a currently available and low cost pump, inside the chamber to get an optimal dissolution in a short preparation time.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS chamber 1, 1'
lateral side wall 11
top edge 110
lower part 111
bottom wall 12
liquid inlet 2
beverage outlet 3, 3'
sub-conduit 30
divider 31
bump 4
first side 41
leading part end 411
trailing part end 412
second side 42
leading part end 421
trailing part end 422
trailing edge 423
central edge 43 nozzle 6
conduit 9
beverage preparation apparatus 100
tank 101
pump 102
heater 103
valve 104
liquid supplying system 105
pipe 106
container 107
dosing device 108
service tray 109
controller 111
command 112
drinking receptacle 113
liquid 90
straight jet of liquid 91
swirl of liquid 92

The invention claimed is:

1. A beverage preparation apparatus comprising:
   at least one chamber for receiving and mixing an aqueous liquid and at least one soluble beverage ingredient, the at least one chamber comprising:
   a lateral side wall, a lower part of the lateral side wall being essentially cylindrical, and the lateral side wall comprising a liquid inlet,
   a bottom wall comprising a beverage outlet,
   the liquid inlet is positioned close to a bottom of the at least one chamber,
   the liquid inlet is configured so that the aqueous liquid is introduced in the at least one chamber as a straight jet of liquid, the straight jet of liquid extending transversely through an internal volume of the at least one chamber along a line L, the line L being offset relative to a longitudinal central axis of the at least one chamber,
   at an area of the lateral side wall opposed to the liquid inlet and crossed by the line L, the at least one chamber comprises a bump extending from the lateral side wall inside the at least one chamber, the bump having a shape designed:
   to convert the straight jet of liquid extending transversely through the internal volume of the at least one chamber into a swirl flowing along the lateral side wall off the at least chamber, and
   to reduce a diameter of the swirl rotating back to the bump and to guide the swirl in a direction of the liquid inlet,
   the bump comprises a first side and a second side, the first side and the second side are lateral and at least partially curved, each extending gradually from a cylinder defined by the lateral side wall inside the inner volume of the at least one chamber and converging at a central common essentially vertical edge,
   the first side is crossed by the line L and comprises:
   a curved trailing part end tangent to the lateral side wall, and
   a leading part end oriented so that an angle between the leading part end and the line L is of at most 45°,
   the second side comprises:
   a curved leading part end tangent to the lateral side wall, and
   a trailing part end oriented so that an angle between the trailing part end and the line L is of at most 90°, and
   a trailing edge positioned at a distance $d_2$ from a centre O of the lateral side wall of the at least one chamber inferior to a radius $r_0$ of the lateral side wall of the at least one chamber.

2. The beverage preparation apparatus according to claim 1, wherein the first side is positioned relatively to the line L so that line L crosses the first side at a middle distance between two edges of the first side.

3. The beverage preparation apparatus according to claim 1, wherein the first side is an arc having a radius $r_1$ equal to a radius $r_2$ of an arc of the second side of the bump.

4. The beverage preparation apparatus according to claim 1, wherein the first side is a combination of an arc at the curved trailing part end and a flat surface at the leading part end, a radius $r_{11}$ of the arc being inferior to a radius $r_2$ of an arc of the second side of the bump.

5. The beverage preparation apparatus according to claim 1, wherein the second side is an arc, the arc presenting having a radius $r_2$ inferior to the radius $r_0$ of the lateral side wall of the at least one chamber.

6. The beverage preparation apparatus according to claim 5, wherein a centre $O_2$ of the arc forming the second side is positioned at a distance $d_{O2}$ from a central axis of the lateral side wall of the at least one chamber equal to the distance $d_2$ between the trailing edge of the second side and the centre O of the lateral side wall of the at least one chamber.

7. The beverage preparation apparatus according to claim 5, wherein the radius $r_2$ of the arc of the second side is inferior to the distance $d_2$ between the trailing edge of the second side and the centre O of the lateral side wall of the at least one chamber.

8. The beverage preparation apparatus according to claim 1, wherein the line L is offset relative to the longitudinal central axis of the at least one chamber by a distance d measured orthogonally from a direction of orientation of the liquid inlet to the longitudinal central axis of the at least one chamber, and the ratio $d/r_0$ is between 0,2 and 0,4.

9. The beverage preparation apparatus according to claim 1, wherein the line L is inclined downwardly.

10. The beverage preparation apparatus according to claim 1, wherein the beverage outlet is a straight conduit subdivided in at least four straight sub-conduits.

11. The beverage preparation apparatus according to claim 10, wherein the length $L_0$ of the conduit of the beverage outlet is greater than the hydraulic diameter $D_0$ of the beverage outlet.

12. The beverage preparation apparatus according to claim 10, wherein the at least one chamber has an internal volume of between 40 and 100 ml, and a hydraulic diameter $D_0$ of the straight conduit of the beverage outlet is of at least 2 mm.

13. The beverage preparation apparatus according to claim 1, wherein the position of the beverage outlet is offset the longitudinal central axis of the lateral side wall of the at least one chamber.

14. The beverage preparation apparatus according to claim 1 comprising a liquid supply system connectable to the liquid inlet.

15. The beverage preparation apparatus according to claim 1 comprising a dosing device configured for dispensing a dose of soluble beverage ingredient in the at least one chamber.

16. A method for producing a beverage in a beverage preparation apparatus, the method comprising:
   providing the beverage preparation apparatus, the beverage preparation apparatus comprising at least one chamber for receiving and mixing an aqueous liquid and at least one soluble beverage ingredient, the at least one chamber comprising:

a lateral side wall, a lower part of the wall being essentially cylindrical, and the lateral side wall comprising a liquid inlet, a bottom wall comprising a beverage outlet, the liquid inlet is positioned close to a bottom of the at least one chamber, the liquid inlet is configured so that the aqueous liquid is introduced in the at least one chamber as a straight jet of liquid, the straight jet of liquid extending transversely through an internal volume of the at least one chamber along a line L, the line L being offset relative to a longitudinal central axis of the at least one chamber, at an area of the lateral side wall opposed to the liquid inlet and crossed by the line L, the at least one chamber comprises a bump extending from the lateral side wall inside the at least one chamber, the bump having a shape designed:

to convert the straight jet of liquid extending transversely through the internal volume of the at least one chamber into a swirl flowing along the lateral side wall off the at least one chamber, and to reduce a diameter of the swirl rotating back to the bump and to guide the swirl in a direction of the liquid inlet, the bump comprises a first side and a second side, the first side and the second side are lateral and at least partially curved, each extending gradually from a cylinder defined by the lateral side wall inside the inner volume of the at least one chamber and converging at a central common essentially vertical edge, the first side is crossed by the line L and comprises:

a curved trailing part end tangent to the lateral side wall, and a leading part end oriented so that an angle between the leading part end and the line L is of at most 45°, the second side comprises:

a curved leading part end tangent to the lateral side wall, and a trailing part end oriented so that an angle between the trailing part end and the line L is of at most 90°, and a trailing edge positioned at a distance $d_2$ from a centre O of the lateral side wall of the at least one chamber inferior to a radius $r_0$ of the lateral side wall of the at least one chamber;

dosing the at least one chamber with the at least one soluble beverage ingredient, and introducing the aqueous liquid through the liquid inlet.

17. The method of claim 16, wherein the first side is positioned relatively to the line L so that line L crosses the first side at a middle distance between two edges of the first side.

18. The method of claim 16, wherein the first side is an arc having a radius $r_1$ equal to a radius $r_2$ of an arc of the second side of the bump.

19. The method of claim 16, wherein the first side is a combination of an arc at the curved trailing part end and a flat surface at the leading part end, a radius $r_{11}$ of the arc being inferior to a radius $r_2$ of an arc of the second side of the bump.

20. The method of claim 16, wherein the second side is an arc having a radius $r_2$ inferior to the radius $r_0$ of the lateral side wall of the at least one chamber.

* * * * *